United States Patent
Ikeda (10) Patent No.: US 10,983,333 B2
(45) Date of Patent: Apr. 20, 2021

(54) LIGHT SOURCE DEVICE AND PROJECTION DISPLAY APPARATUS

(71) Applicant: Panasonic Intellectual Property Management Co., Ltd., Osaka (JP)

(72) Inventor: Takashi Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/565,887

(22) Filed: Sep. 10, 2019

(65) Prior Publication Data

US 2020/0088990 A1 Mar. 19, 2020

(30) Foreign Application Priority Data

Sep. 18, 2018 (JP) .............................. JP2018-173175
Aug. 1, 2019 (JP) .............................. JP2019-141960

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01); *G03B 21/2066* (2013.01)

(58) Field of Classification Search
CPC .............. G02B 26/008; G03B 21/2066; G03B 21/204; G03B 33/08
See application file for complete search history.

(56) References Cited

U.S. PATENT DOCUMENTS

| 2013/0242266 A1* | 9/2013 | Hara | G03B 21/206 353/31 |
| 2014/0176916 A1* | 6/2014 | Masuda | G03B 21/204 353/38 |
| 2014/0211170 A1 | 7/2014 | Kitano et al. | |

(Continued)

FOREIGN PATENT DOCUMENTS

| JP | 2011-70882 | 4/2011 |
| JP | 2014-160233 | 9/2014 |

(Continued)

*Primary Examiner* — Rajarshi Chakraborty
*Assistant Examiner* — Glenn D Zimmerman
(74) *Attorney, Agent, or Firm* — Wenderoth, Lind & Ponack, L.L.P.

(57) ABSTRACT

A light source device includes a phosphor wheel, a light source, a color separating-and-mixing element, and a light-guide optics. The phosphor wheel includes a base plate having a first light passage area and a second light passage area as a pair of light passage areas being annularly and point symmetrically arranged with respect to a center of the base plate, a phosphor area annularly formed on the base plate, and a motor that rotates the base plate. The color separating-and-mixing element disposed between the light source and the phosphor wheel changes a direction of traveling of fluorescence created as a result of light having being incident on the phosphor area and been converted in wavelength. The light-guide optics is provided to cause light from the light source to travel through the first light passage area, then through the second light passage area, and finally enter into the color separating-and-mixing element.

6 Claims, 5 Drawing Sheets

(56) References Cited

U.S. PATENT DOCUMENTS

| | | | | |
|---|---|---|---|---|
| 2014/0226306 A1* | 8/2014 | Khan | ................... | H04N 9/3158 |
| | | | | 362/84 |
| 2015/0211693 A1 | 7/2015 | Chang et al. | | |
| 2016/0165194 A1* | 6/2016 | Hartwig | ............... | H04N 9/3111 |
| | | | | 353/31 |

FOREIGN PATENT DOCUMENTS

| | | |
|---|---|---|
| JP | 2015-165484 | 9/2015 |
| JP | 2015-184407 | 10/2015 |

* cited by examiner

LIGHT SOURCE DEVICE AND PROJECTION DISPLAY APPARATUS

BACKGROUND

1. Technical Field

The present disclosure relates to a light source device included in a projection display apparatus, the light source device including a phosphor wheel.

2. Description of the Related Art

A light source device that emits beams of light in different wavelength ranges in a time-sharing manner, using a phosphor wheel, thereby emits white light is described in, for example, PTL 1 (Unexamined Japanese Patent Publication No. 2014-160233).

SUMMARY

The present disclosure provides a light source device that allows miniaturization of the device, the light source device including a phosphor wheel.

The light source device according to the present disclosure includes a phosphor wheel, a light source, a color separating-and-mixing element, and a light-guide optics. The phosphor wheel includes a base plate having a pair of light passage areas being annularly and point symmetrically arranged with respect to a center of the base plate, the pair of light passage areas being a first light passage area and a second light passage area, a phosphor area annularly formed on the base plate, and a motor that rotates the base plate. The color separating-and-mixing element is disposed between the light source and the phosphor wheel, the color separating-and-mixing element changes a direction of traveling of fluorescence created as a result of light from the light source having being incident on the phosphor area and been converted in wavelength. The light-guide optics is provided so that light from the light source travels through the first light passage area and then travels through the second light passage area, and finally enters into the color separating-and-mixing element.

The light source device using the phosphor wheel according to the present disclosure is effective for miniaturizing the device.

DETAILED DESCRIPTION

Exemplary embodiments will hereinafter be described in detail with reference being made to drawings on a necessary basis. It should be noted, however, that an unnecessarily detailed description may be omitted. For example, detailed description of well-known matters and redundant description of configurations that are substantially the same may be omitted. This is to avoid making the following description unnecessarily redundant and to help those skilled in the art in understanding the exemplary embodiments.

The accompanying drawings and the following description are provided to enable those skilled in the art to sufficiently understand the present disclosure, and are not intended to limit the subject matter described in the claims.

First Exemplary Embodiment

[1-1-1. Configuration of Light Source Device]

A configuration of a phosphor wheel used in a light source device according to a first exemplary embodiment will first to be described in detail.

Figure 1A:
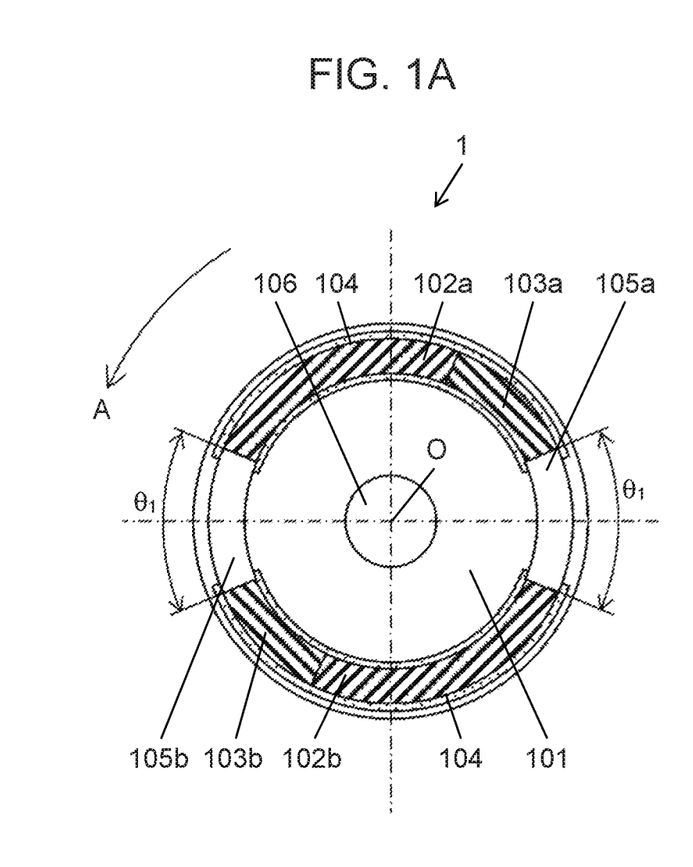
FIG. 1A is a plan view showing a configuration of a phosphor wheel used in a light source device according to a first exemplary embodiment.
Figure 1B:
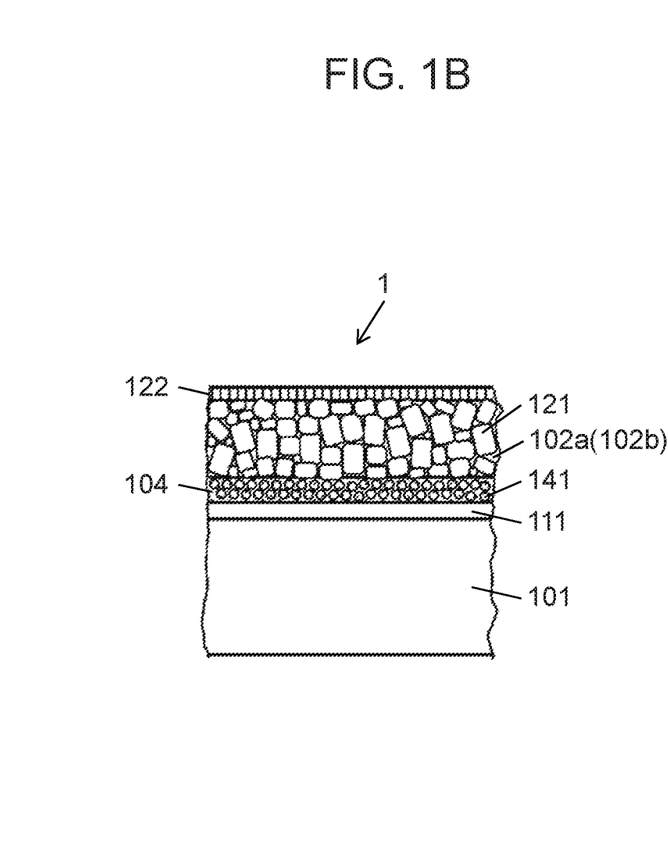
FIG. 1B is a principle part sectional view showing a configuration of the phosphor wheel used in the light source device according to the first exemplary embodiment.

FIG. 1A is a plan view showing a configuration of a phosphor wheel according to the first exemplary embodiment, and FIG. 1B is a principle part sectional view showing a configuration of the phosphor wheel according to the first exemplary embodiment.

As shown in FIG. 1A, phosphor wheel 1 includes disc-shaped base plate 101, which has two openings, i.e., opening 105a and opening 105b having the same central angle ($\theta$1) and formed at locations on a circumference, the locations being points of equal radius from rotation center O and point symmetric with respect to rotation center O with each other.

The base plate 101 of phosphor wheel 1 has two non-opening areas that are located on the circumference in such a way as to be equal with openings 105a, 105b in radius from rotation center O. To the two non-opening areas, a pair of phosphor layers 102a, 103a and a pair of phosphor layers 102b, 103b are bonded by bonding layer 104, respectively. Phosphor layers 102a, 103a convert light from laser light source 301 (see FIG. 4), which is an exciting light source to be described later, in wavelength to emit beams of light different from each other in wavelength, and phosphor layers 102b, 103b emit beams of light different from each other in wavelength.

Hence, opening 105a and opening 105b of the same shape, phosphor layer 102a and phosphor layer 102b of the same shape, and phosphor layer 103a and phosphor layer 103b of the same shape are formed in an annular area along the circumference of base plate 101. In other words, a pair of opening 105a and opening 105b are formed in the annular area of the base plate in such a way as to be point symmetric with respect to the center of the base plate, the center serving as a point of symmetry. Openings 105a, 105b are an example of a pair of light passage areas. In the same manner, according to the first exemplary embodiment, a pair of phosphor layer 102a and phosphor layer 102b as well as a pair of phosphor layer 103a and phosphor layer 103b are also formed in the annular area of the base plate in such a way as to be point symmetric with respect to the center of the base plate, i.e., the point of symmetry. Base plate 101 having the openings and the phosphor layers is fitted with motor 106, which rotates around rotation center O of the base plate. This base plate 101 makes up phosphor wheel 1.

As shown in FIG. 1B, which is a sectional view of a principle part of phosphor wheel 1, phosphor layers 102a, 102b are made by firing phosphor particles 121 to form a part of a ring from fired phosphor particles 121. Each of phosphor layers 102a, 102b has its one surface coated with antireflection coating 122. Phosphor layers 102a, 102b are excited by light from laser light source 301, which will be described later, and emit fluorescence within a yellow wavelength range. Phosphor layers 103a, 103b have the same sectional structure as that of phosphor layers 102a, 102b, are excited by light from laser light source 301, which will be described later, and emit fluorescence within a green wavelength range.

Antireflection coating 122 is a dielectric multi-layer coating, and is provided as an optimum coating that minimizes a surface reflection loss of incoming/outgoing light in a wavelength range of excited light from laser light source 301, which will be described later, and in a wavelength range of fluorescence that is emitted as a result of exciting light having excited phosphor particles 121 and been converted in wavelength.

Base plate 101 is overlaid with reflective coating 111. Reflective coating 111 is a multi-layer coating created by sandwiching a reflective coating made of, for example, aluminum, silver, or silver alloy between a pair of protective coatings. Reflective coating 111 is optimized to maximize reflectance in a wavelength range of light from laser light source 301 and in a wavelength range of fluorescence that is emitted as a result of light from laser light source 301 having been converted in wavelength by phosphor particles 121.

The pair of phosphor layers 102a, 102b and the pair of phosphor layers 103a, 103b are bonded to the base plate overlaid with reflective coating 111, by bonding layer 104, which is made of silicone filled with content particles 141 that improve heat conductivity and reflectance, such that the pair of phosphor layers 102a, 102b as well as the pair of phosphor layers 103a, 103b are axisymmetric (point symmetric) with respect to the rotation axis of phosphor wheel 1. Titanium oxide, aluminum oxide, zinc oxide, or the like can be used as content particles 141.

FIG. 1B shows an example in which phosphor layer 102a formed by sintering phosphor particles 121 is bonded to base plate 101 overlaid with reflective coating 111, by bonding layer 104. In a configuration different from this example, however, phosphor layer 102a may be formed directly on base plate 101 by filling silicone with phosphor particles 121. In another configuration, bonding layer 104 made by filling silicone with content particles 141 that improve heat conductivity and reflectance may be interposed between phosphor layer 102a, which is made by filling silicone with phosphor particles 121, and base plate 101.

Moreover, although phosphor wheel 1 shown in FIG. 1A and FIG. 1B is the example which provided openings 105a, 105b as a light passage area in the base plate 101, the light passage area may be configured using a transparent base plate instead of base plate 101. That is, in the case of using the transparent base plate, the layer configuration on the transparent base plate corresponding to the area where the phosphor layers 102a, 102b, 103a, 103b are provided is the same as that shown in FIG. 1B, and the light passage area can be configured by not forming the reflective coating 111 in the area corresponding to openings 105a, 105b.

Figure 2:
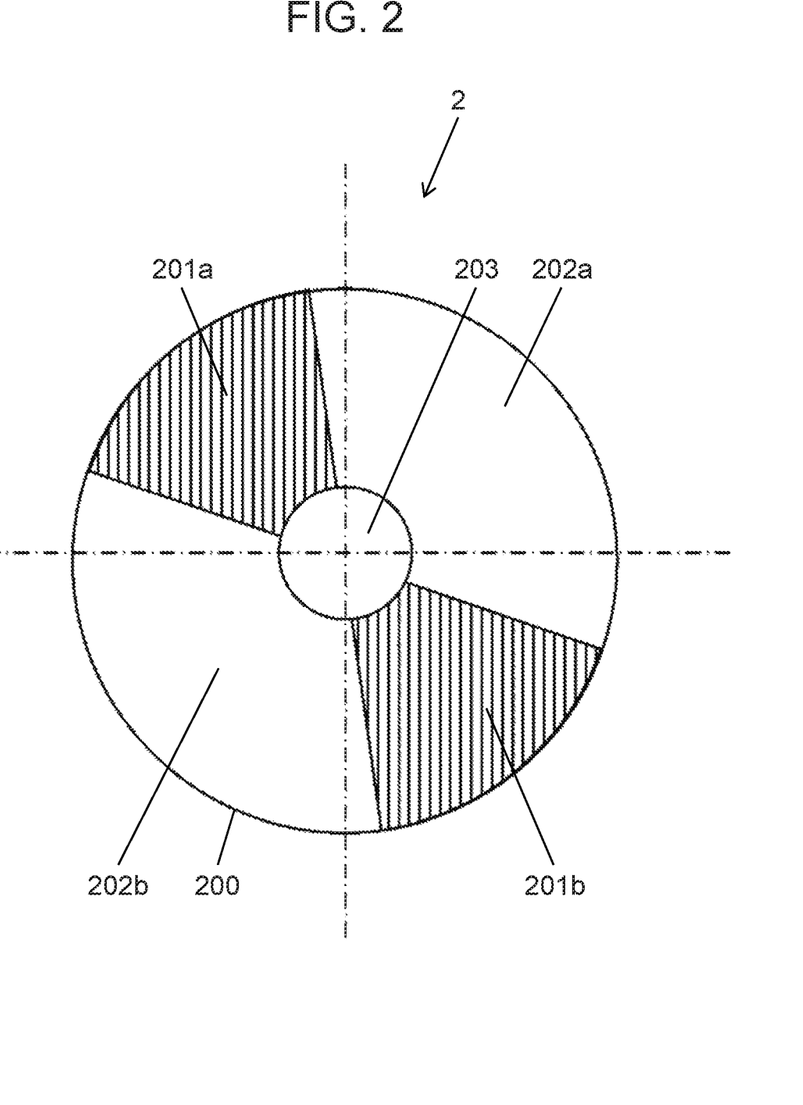
FIG. 2 is a front view showing a configuration of a color wheel.

FIG. 2 is a configuration diagram of a color wheel according to the first exemplary embodiment.

Color wheel 2 includes base glass 200 having red light transmitting areas 201a, 201b and all-wavelength light transmitting areas 202a, 202b, and motor 203 that rotates base glass 200. In red light transmitting areas 201a, 201b on base glass 200, a dielectric multi-layer coating is formed, which is optimized to have a characteristic for transmitting only the light within a red wavelength range. All-wavelength light transmitting areas 202a, 202b are areas on base glass 200 that are optimized to maximize transmissivity for light of wavelengths covering the entire wavelength ranges. A pair of red light transmitting areas 201a, 201b as well as a pair of all wavelength light transmitting areas 202a, 202b are set point symmetric with respect to a rotation center of color wheel 2, the rotation center serving as a point of symmetry. Red light transmitting areas 201a, 201b are an example of a color filter area.

Phosphor wheel 1 and color wheel 2 are synchronized with each other by a synchronous circuit (not shown), and therefore rotate at the same rotation phase in an arrangement in which phosphor wheel 1 of FIG. 1A and color wheel 2 of FIG. 2 are aligned along center lines.

Figure 4:
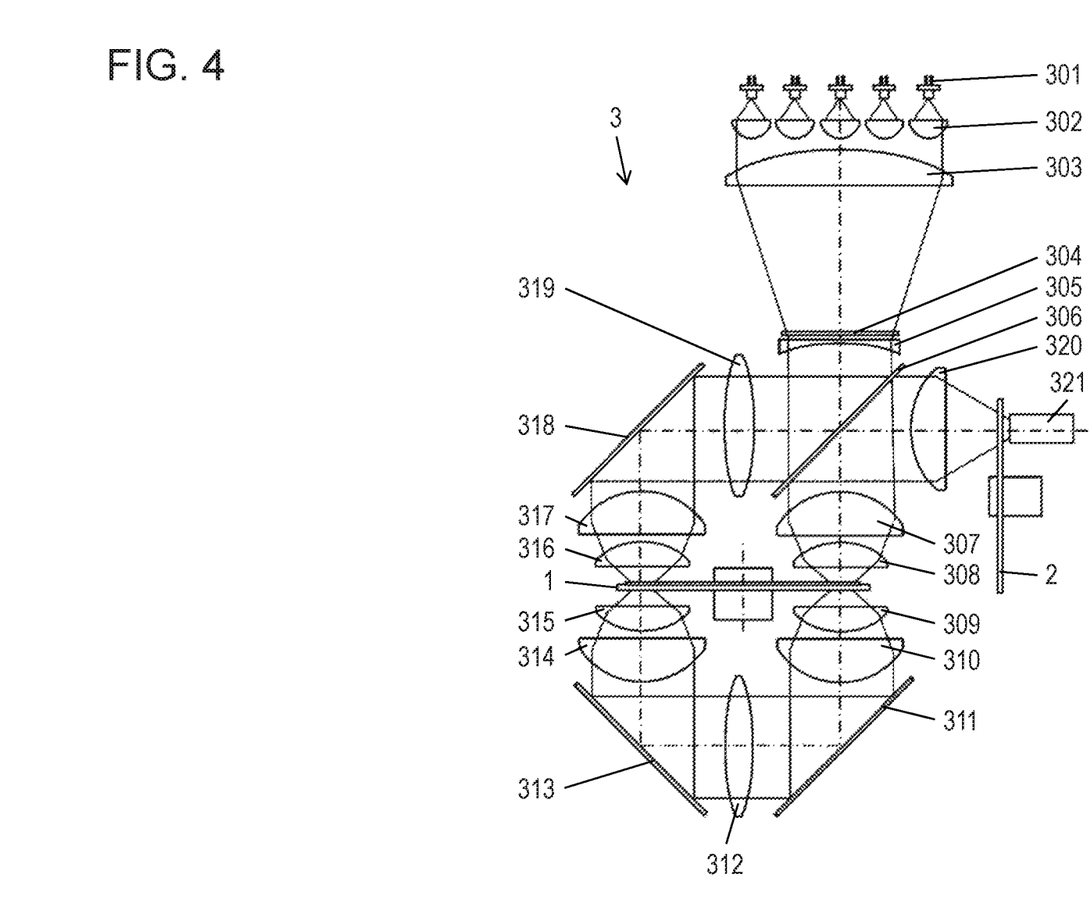
FIG. 4 shows a configuration of the light source device according to the first exemplary embodiment.

The light source device according to the first exemplary embodiment will then be described with reference to FIG. 4. FIG. 4 shows a configuration of the light source device according to the first exemplary embodiment.

As shown in FIG. 4, light source device 3 according to the first exemplary embodiment includes phosphor wheel 1 and color wheel 2. Phosphor wheel 1 and color wheel 2 have been described above and therefore will not be described further.

As shown in FIG. 4, light source device 3 according to the first exemplary embodiment includes phosphor wheel 1 and laser light sources 301. Laser light sources 301 are an example of exciting light sources that emit light within a blue wavelength range.

Light source device 3 also includes collimator lenses 302, convex lens 303, diffuser 304, concave lens 305, dichroic mirror 306, and convex lenses 307, 308. These optical components are an example of an optical system that guides light emitted from laser light sources 301, to phosphor wheel 1.

Beams of light within the blue wavelength range that are emitted from laser light sources 301 are transformed into collimated beams of light by collimator lenses 302 arranged on an emission side of laser light sources 301. On an emission side of collimator lenses 302, convex lens 303 is disposed, which condenses beams of light coming out of collimator lenses 302, that is, beams of light from laser light sources 301 into a beam of light with a reduced beam width. This beam of light reduced in beam width by convex lens 303 is incident on diffuser 304 disposed on an emission side of convex lens 303. Diffuser 304 reduces non-uniformity of the beam of light that convex lens 303 has failed to eliminate completely.

Light coming out of diffuser 304 is incident on concave lens 305. Concave lens 305 transforms light coming out of diffuser 304 into collimated light.

Collimated light coming out of concave lens 305 is incident on dichroic mirror 306 disposed on an emission side of concave lens 305. Dichroic mirror 306 is set at an angle of 45 degrees against an optical axis. Dichroic mirror 306 has a characteristic that transmits light within the blue wavelength range, the light having been emitted from laser light sources 301, while reflects light from laser light sources 301 having excited phosphor layers 102a, 102b, 103a, and 103b of phosphor wheel 1 and been converted in wavelength. Light coming out of concave lens 305 and is incident on dichroic mirror 306 thus travels through dichroic mirror 306. Light having traveled through dichroic mirror 306 and being within the wavelength range of light emitted from laser light sources 301, then enters into convex lenses 307, 308 in order, which create a converged beam of light incident on phosphor wheel 1. Dichroic mirror 306 is an example of a color separating-and-mixing element.

Phosphor wheel 1 is disposed such that phosphor layers 102a, 102b, 103a, and 103b or openings 105a, 105b are counter to convex lens 308 or convex lens 316. As shown in FIG. 1A, phosphor wheel 1 is rotated by motor 106 around rotation center O in a direction indicated by an arrow A. As a result, exciting light from laser light sources 301 enters into the phosphor layers and the openings in sequence in a time sequence manner. Concentrated emission of exciting light on a single spot on the phosphor layers or the openings is therefore suppressed.

A case where light from laser light sources 301 converged by convex lenses 307 and 308 enters into phosphor layers 102*a*, 102*b*, 103*a*, 103*b* in a time sequence manner will hereinafter be described.

Exciting light from laser light sources 301 that is incident on phosphor layers 102*a*, 102*b*, 103*a*, 103*b* is converted in wavelength by the phosphor layers. In other words, exciting light from laser light sources 301 is transformed into fluorescence different in wavelength range from the exciting light. The wavelength range of light emitted out from phosphor layers 102*a*, 102*b*, 103*a*, 103*b* is therefore different from the wavelength range of light from laser light source 301. In this case, phosphor layers 102*a*, 102*b* emits fluorescence within the yellow wavelength range, while phosphor layers 103*a*, 103*b* emits fluorescence within the green wavelength range. These beams of fluorescence have been changed in their direction of traveling by 180 degrees against the direction of traveling of light incident on phosphor layers 102*a*, 102*b*, 103*a*, 103*b*. This means that fluorescence is emitted toward convex lens 308. Fluorescence thus travels through convex lens 308 and enters into convex lens 307, which transforms fluorescence into collimated fluorescence. Collimated fluorescence then is incident on dichroic mirror 306.

As mentioned above, dichroic mirror 306 is set at 45 degrees against the optical axis of fluorescence. In addition, dichroic mirror 306 has the characteristic that transmits light within the blue wavelength range, the light having been emitted from laser light sources 301, while reflects fluorescence with a converted wavelength that comes out of phosphor layers 102*a*, 102*b*, 103*a*, 103*b* of phosphor wheel 1. Fluorescence incident on dichroic mirror 306 is thus reflected by dichroic mirror 306, which changes the direction of traveling of fluorescence by 90 degrees. As a result, fluorescence travels to convex lens 320 to enter thereon.

A case where light from laser light sources 301 converged by convex lenses 307 and 308 enters into opening 105*a* in a time sequence manner will hereinafter be described.

Exciting light from laser light sources 301 that is incident on opening 105*a* travels through opening 105*a* and enters into convex lenses 309 and 310 in order, which transforms exciting light into collimated light. Collimated light created out of exciting light from laser light sources 301 travels to reflective mirror 311, convex lens 312, reflective mirror 313, convex lens 314, and convex lens 315 in sequence. Through this course of traveling, collimated light is changed in its direction of traveling by 180 degrees, and is finally condensed onto opening 105*b*, which is the other opening of phosphor wheel 1. In a case where exciting light from laser light sources 301 enters into opening 105*b*, exciting light having passed through opening 105*b* takes the same course of traveling as described above, and is finally condensed, in this case, onto opening 105*a*.

Light from laser light sources 301 that is converged on opening 105*b*, i.e., the other opening travels through opening 105*b* and then enters into convex lenses 316 and 317 in sequence, which transforms incoming light into collimated light. Collimated light then travels to reflective mirror 318 and convex lens 319. Through this course of traveling, light reflected by reflective mirror 318 changes its direction of traveling by 90 degrees and, consequently, proceeds to dichroic mirror 306.

As mentioned above, dichroic mirror 306 is set at 45 degrees against the optical axis of light from laser light source 301, the light coming out of convex lens 319. Dichroic mirror 306 has the characteristic that transmits light within the blue wavelength range, the light having been emitted from laser light sources 301, while reflects fluorescence with a converted wavelength that comes out of phosphor layers 102*a*, 102*b*, 103*a*, 103*b* of phosphor wheel 1. Light coming out of convex lens 319 and incident on dichroic mirror 306, the light having been emitted from laser light sources 301, therefore, travels through dichroic mirror 306 and enters into convex lens 320.

Behavior of light that enters into convex lens 320 and is condensed by convex lens 320 will then be described.

A beam of fluorescence from phosphor wheel 1 and a beam of light from laser light sources 301 having traveled through two openings of phosphor wheel 1 are emitted onto color wheel 2 in a time-sequence manner.

The following description will be made on the assumption that light from laser light sources 301 enters into phosphor layer 102*a*, phosphor layer 103*a*, opening 105*a*, phosphor layer 102*b*, phosphor layer 103*b*, and opening 105*b* of phosphor wheel 1 in order as phosphor wheel 1 makes a round of rotation.

As a result of rotation of phosphor wheel 1, a point of convergence of light from laser light sources 301 on phosphor wheel 1 shifts from phosphor layer 102*a* to opening 105*b* in the order indicated above. In this case, convex lens 320 emits yellow light, green light, blue light, yellow light, green light, and blue light in order. By the synchronous circuit (not shown), color wheel 2 and phosphor wheel 1 are synchronized in rotation phase with each other to match a point of time at which converged light from laser light sources 301 starts incident on phosphor layer 102*a* of phosphor wheel 1 to a point of time at which yellow light coming out of phosphor layer 102*a*, the yellow light being created by changing the converged light in wavelength, enters into red light transmitting area 201*a* of color wheel 2. Initially, therefore, yellow light from convex lens 320 enters into red light transmitting area 201*a* of color wheel 2, travels through red light transmitting area 201*a*, and comes out in the form of red light, from color wheel 2.

A central angle of red light transmitting area 201*a* of color wheel 2 is determined to be smaller than a central angle of phosphor layer 102*a* of phosphor wheel 1. Because of this, at a point of time at which light from phosphor wheel 1 starts entering into all-wavelength light transmitting area 202*a* after red light transmitting area 201*a* terminates as a result of rotation of color wheel 2, converged light from laser light sources 301 is still incident on phosphor layer 102*a* of phosphor wheel 1. As a result, convex lens 320 still emits yellow light, and this yellow light travels through all-wavelength light transmitting area 202*a* of color wheel 2 to come out of color wheel 2.

Then, at a point of time at which the area of phosphor layer 102*a* terminates as a result of rotation of phosphor wheel 1 and emission of exciting light onto phosphor layer 103*a* starts, green fluorescence comes out of phosphor wheel 1. Consequently, green light comes out of convex lens 320. At this time, this green light travels through all-wavelength light transmitting area 202*a* of color wheel 2 and therefore comes out of color wheel 2.

Then, at a point time at which the area of phosphor layer 103*a* terminates as a result of rotation of phosphor wheel 1 and light from laser light sources 301 enters into opening 105a, convex lens 320 emits blue light as light from laser light sources 301. At this time, light from convex lens 320 is incident on all-wavelength light transmitting area 202a of color wheel 2. Blue light from convex lens 320 thus travels through all-wavelength light transmitting area 202a, which means that blue light comes out of color wheel 2.

Figure 3:
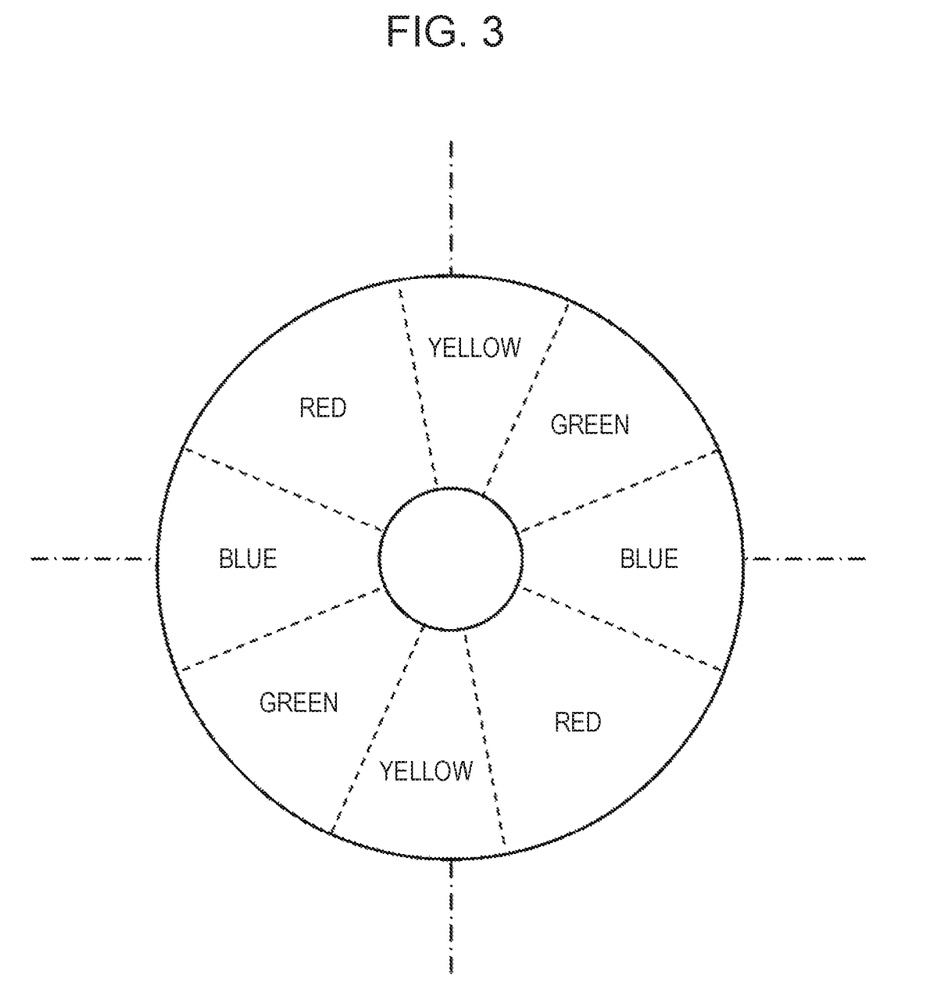
FIG. 3 is a diagram for explaining colored light emitted from the color wheel.

FIG. 3 is a diagram for explaining order of emission of beams of colored light from color wheel 2 in a configuration in which phosphor wheel 1 of FIG. 1A and color wheel 2 of FIG. 2 are aligned along central lines (indicated by single-dot chain lines) to match their rotation phases to each other. When phosphor wheel 1 and color wheel 2 make a half round of rotation synchronously, color wheel 2 emits red light, yellow light, green light, and blue light in a time-sequence manner. When they make a full-round of rotation, color wheel 2 then emits red light, yellow light, green light, blue light, red light, yellow light, green light, and blue light in order in a time-sequence manner.

FIG. 4 is referred to again. Light coming out of color wheel 2 enters into rod integrator 321, and is multi-reflected on an inner surface of rod integrator 321. As a result, light with improved uniformity is emitted from an emission end of rod integrator 321.

Phosphor wheel 1 shown in FIG. 1A has two openings. However, the number of the openings is not limited to two. More than two openings may be provided if the openings have the same central angle and are arranged point symmetric with each other.

Phosphor wheel 1 shown in FIG. 1A has phosphor layers 102a, 102b that emit yellow fluorescence and phosphor layers 103a, 103b that emit green fluorescence. The configuration of phosphor wheel 1 is, however, not limited to this. Phosphor wheel 1 may be configured to have phosphors that emit light of the same wavelength only. The two non-opening areas of phosphor wheel 1 may be composed respectively of phosphors that emit beams of fluorescence different in wavelength from each other. Each non-opening area is composed of two phosphors that emit beams of fluorescence different in wavelength from each other. The non-opening area, however, may be composed of three or more phosphors.

The configuration of color wheel 2 is not limited to the configuration shown in FIG. 2, and may be changed properly depending on the configuration of phosphor wheel 1.

[1-1-2. Advantageous Effects]

An effect of the present disclosure will be described with reference to FIG. 4.

As shown in FIG. 4, phosphor wheel 1 is disposed inside an optical system (i.e., light-guide optics made up of dichroic mirror 306 to convex lens 319) in which blue exciting light travels. Compared with a light source device having phosphor wheel 1 disposed outside the optical system in which blue exciting light travels, therefore, the light source device according to the present disclosure is reduced in size as a whole.

[1-2-1. Projection Display Apparatus Including the Light Source Device]

Figure 5:
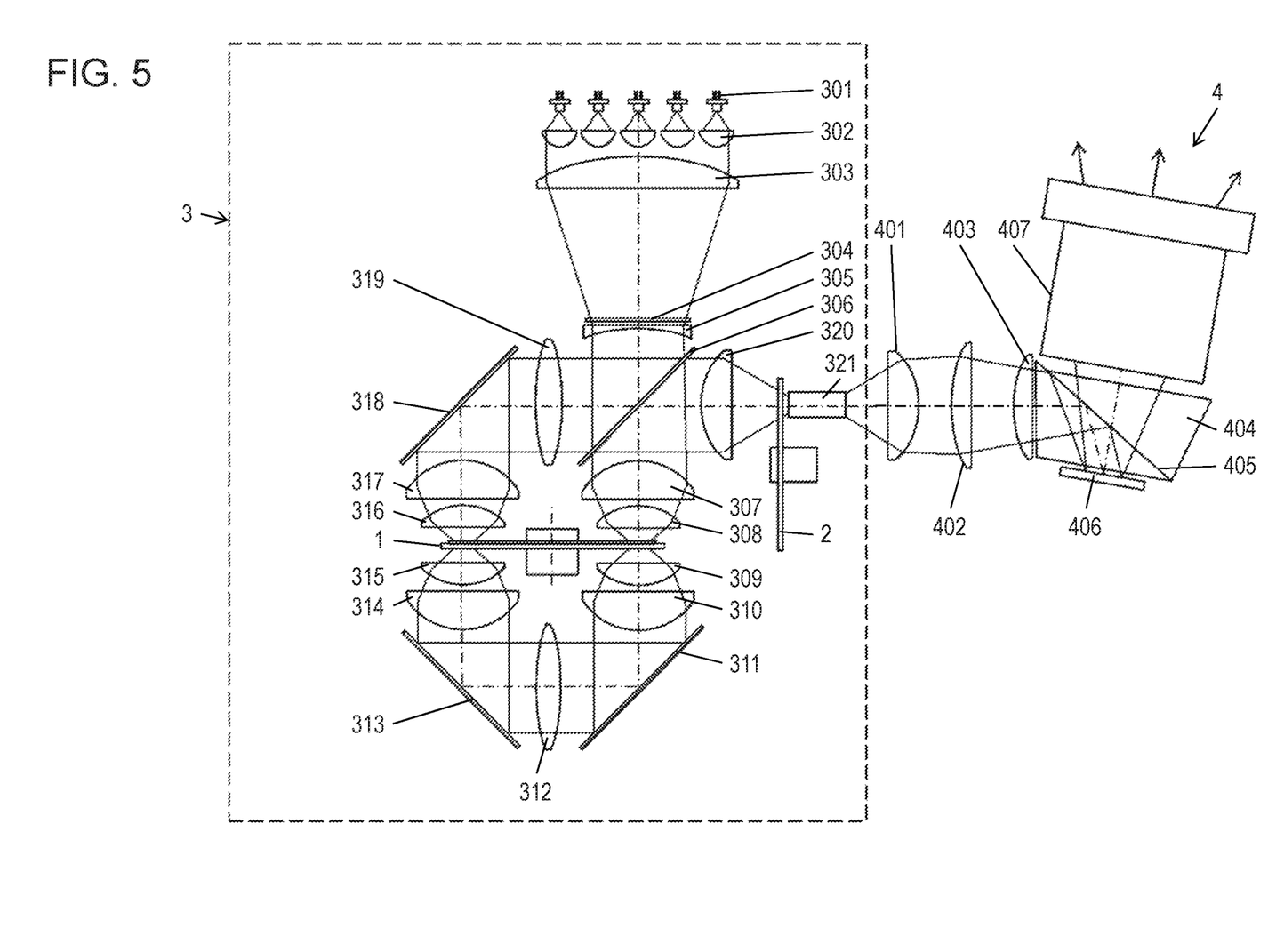
FIG. 5 shows a configuration of a projection display apparatus including the light source device according to the first exemplary embodiment.

A projection display apparatus including the light source device according to the first exemplary embodiment will then be described with reference to FIG. 5. FIG. 5 is a configuration diagram of projection display apparatus 4 according to the first exemplary embodiment.

Projection display apparatus 4 includes light source device 3. Projection display apparatus 4 includes also relay lenses 401, 402, 403, total internal reflection prism 404, digital micromirror device (DMD) 406, and projection lens 407.

In the following description, behavior of red light, yellow light, green light, blue light, red light, yellow light, green light, and blue light that are emitted from rod integrator 321 will be explained but details of light source device 3 will not be explained.

Beams of light of respective colors coming out of rod integrator 321 enter a relay lens optics composed of relay lenses 401, 402, 403, i.e., three convex lenses, which focus the beams of light on DMD 406.

Light having traveled through relay lenses 401, 402, 403 making up the relay lens optics is incident on total internal reflection prism 404. Total internal reflection prism 404 has two glass blocks between which minute gap 405 is formed. Light entering total internal reflection prism 404 is reflected by minute gap 405 to enter into DMD 406.

DMD 406 is synchronized with phosphor wheel 1 and color wheel 2 by a synchronous circuit and an image circuit, which are not shown, and is driven such that each pixel is switched on and off in correspondence to image information. As a result, light incident on respective pixels of DMD 406 is reflected in different directions on a pixel-by-pixel basis.

Light reflected by switched-on pixels of DMD 406 enters total internal reflection prim 404 and is incident on minute gap 405 at an angle smaller than a total reflection angle, thus passing through minute gap 405. Light passing through minute gap 405 is projected onto a screen (not shown) by projection lens 407 to form an enlarged image on the screen.

[1-2-2. Advantageous Effects and the Like]

Projection display apparatus 4 described above is equipped with light source device 3, which allows miniaturization of projection display apparatus 4.

The present disclosure can be applied to the light source device included in the projection display apparatus.

What is claimed is:

1. A light source device comprising:
    a phosphor wheel including
        a base plate having a pair of light passage areas being annularly and point symmetrically arranged with respect to a center of the base plate, the pair of light passage areas being a first light passage area and a second light passage area,
        a phosphor area annularly formed on only one surface of the base plate, with no phosphor being provided on an opposite surface of the base plate, and
        a motor that rotates the base plate;
    a light source;
    a color separating-and-mixing element disposed between the light source and the phosphor wheel, the color separating-and-mixing element changing a direction of traveling of fluorescence created as a result of light from the light source having being incident on the phosphor area and been converted in wavelength; and
    a light-guide optics in which light from the light source travels through the first light passage area and then travels through the second light passage area, and finally reenters into the color separating-and-mixing element.

2. The light source device according to claim 1, further comprising
    a color wheel including a color filter area and an all-wavelength light transmitting area, the color wheel rotating in synchronization with the phosphor wheel.

3. A projection display apparatus comprising the light source device according to claim 1.

4. The light source device according to claim 1, wherein a pair of phosphor layers are formed in the phosphor area, the pair of the phosphor layers being point symmetrically arranged with respect to the center of the base plate.

5. The light source device according to claim 1, wherein a first pair of phosphor layers and a second pair of phosphor layers are formed in the phosphor area, the first pair of the phosphor layers being point symmetrically arranged with respect to the center of the base plate, and the second pair of the phosphor layers being point symmetrically arranged with respect to the center of the base plate.

6. The light source device according to claim 1, wherein the first and second light passage areas are the only light passage areas disposed on the base plate.

\* \* \* \* \*